US008076271B2

(12) United States Patent
Blauch et al.

(10) Patent No.: US 8,076,271 B2
(45) Date of Patent: *Dec. 13, 2011

(54) AQUEOUS TACKIFIER AND METHODS OF CONTROLLING PARTICULATES

(75) Inventors: Matthew E. Blauch, Duncan, OK (US);
Thomas D. Welton, Duncan, OK (US);
Philip D. Nguyen, Duncan, OK (US)

(73) Assignee: Halliburton Energy Services, Inc.,
Duncan, OK (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/864,061

(22) Filed: Jun. 9, 2004

(65) Prior Publication Data

US 2005/0277554 A1 Dec. 15, 2005

(51) Int. Cl.
*E21B 43/25* (2006.01)
*C09K 8/588* (2006.01)
(52) U.S. Cl. ........ 507/226; 507/221; 507/222; 507/224; 507/225; 507/267; 507/269; 166/305.1
(58) Field of Classification Search .................. None
See application file for complete search history.

(56) References Cited

U.S. PATENT DOCUMENTS

| | | | | |
|---|---|---|---|---|
| 3,932,363 A * | 1/1976 | Lehmann et al. | ............. | 525/421 |
| 4,107,057 A * | 8/1978 | Dill et al. | ...................... | 507/226 |
| 4,636,572 A * | 1/1987 | Hudson et al. | ................... | 556/2 |
| 4,670,501 A | 6/1987 | Dymond et al. | ............. | 524/458 |
| 4,681,165 A | 7/1987 | Bannister | ....................... | 166/312 |
| 4,772,646 A | 9/1988 | Harms et al. | .................... | 524/27 |
| 4,777,200 A | 10/1988 | Dymond et al. | ............. | 524/458 |
| 4,940,091 A * | 7/1990 | Shu et al. | ...................... | 166/270 |
| 5,071,890 A * | 12/1991 | Shu et al. | ...................... | 166/288 |
| 5,095,987 A | 3/1992 | Weaver et al. | ................. | 166/276 |
| 5,249,627 A | 10/1993 | Harms et al. | ................... | 166/308 |
| 5,278,203 A | 1/1994 | Harms | ........................... | 523/200 |
| 5,295,543 A * | 3/1994 | Terry et al. | .................... | 166/293 |
| 5,381,864 A | 1/1995 | Nguyen et al. | ............... | 166/280 |
| 5,492,178 A | 2/1996 | Nguyen et al. | ............... | 166/276 |
| 5,501,274 A | 3/1996 | Nguyen et al. | ............... | 166/276 |
| 5,582,249 A | 12/1996 | Caveny et al. | ................ | 166/276 |
| 5,697,440 A | 12/1997 | Weaver et al. | ................ | 166/281 |
| 5,775,425 A | 7/1998 | Weaver et al. | ................ | 166/276 |
| 5,787,986 A | 8/1998 | Weaver et al. | ................ | 166/280 |
| 5,833,000 A | 11/1998 | Weaver et al. | ................ | 166/276 |
| 5,839,510 A | 11/1998 | Weaver et al. | ................ | 166/276 |
| 5,853,048 A | 12/1998 | Weaver et al. | ................ | 166/279 |
| 5,871,049 A | 2/1999 | Weaver et al. | ................ | 166/276 |
| 5,921,317 A | 7/1999 | Dewprashad et al. | ........ | 166/208 |
| 5,924,488 A | 7/1999 | Nguyen et al. | ............... | 166/280 |
| 5,960,878 A | 10/1999 | Nguyen et al. | ............... | 166/276 |
| 5,975,206 A * | 11/1999 | Woo et al. | ..................... | 166/300 |
| 6,016,870 A | 1/2000 | Dewprashad et al. | ........ | 166/295 |
| 6,047,772 A | 4/2000 | Weaver et al. | ................ | 166/276 |
| 6,059,034 A | 5/2000 | Rickards et al. | .............. | 166/280 |
| 6,209,643 B1 | 4/2001 | Nguyen et al. | ................ | 166/276 |
| 6,311,773 B1 | 11/2001 | Todd et al. | ..................... | 166/280 |
| 6,330,916 B1 | 12/2001 | Rickards et al. | .............. | 166/280 |
| 6,439,309 B1 | 8/2002 | Matherly et al. | .............. | 166/276 |
| 6,450,260 B1 | 9/2002 | James et al. | ................... | 166/277 |
| 6,534,449 B1 | 3/2003 | Gilmour et al. | ............... | 507/203 |
| 6,978,836 B2 | 12/2005 | Nguyen et al. | | |
| 7,040,403 B2 * | 5/2006 | Nguyen et al. | ................ | 166/281 |
| 7,044,220 B2 * | 5/2006 | Nguyen et al. | ............. | 166/280.2 |
| 7,178,596 B2 * | 2/2007 | Blauch et al. | ............. | 166/280.2 |
| 7,204,311 B2 * | 4/2007 | Welton et al. | ................. | 166/295 |
| 7,261,156 B2 * | 8/2007 | Nguyen et al. | ................ | 166/276 |
| 7,413,010 B2 * | 8/2008 | Blauch et al. | ................. | 166/249 |
| 7,918,289 B2 | 4/2011 | Oakley et al. | | |
| 7,947,628 B2 | 5/2011 | Oakley et al. | | |
| 2003/0054962 A1 | 3/2003 | England et al. | | |
| 2003/0230408 A1 | 12/2003 | Acock et al. | ................... | 166/297 |
| 2004/0014608 A1 | 1/2004 | Nguyen et al. | ................ | 507/200 |
| 2005/0061509 A1 | 3/2005 | Nguyen | | |
| 2005/0092489 A1 * | 5/2005 | Welton et al. | ............. | 166/280.2 |
| 2006/0118299 A1 * | 6/2006 | Nguyen et al. | ................ | 166/276 |
| 2006/0118300 A1 * | 6/2006 | Welton et al. | ................. | 166/276 |

FOREIGN PATENT DOCUMENTS

| | | |
|---|---|---|
| EP | 1132569 A2 | 12/2001 |
| WO | EP 0 879 935 A2 | 11/1998 |
| WO | WO 2005/021930 | 3/2005 |

OTHER PUBLICATIONS

Foreign Search Report and Opinion (PCT Appl. No. GB2004/002943), Nov. 19, 2004.
Attia, Yosry, et al, *Adsorption Thermodynamics of a Hydrophobic Polymeric Flocculant on Hydrophobic Colloidal Coal Particles*, 1991, American Chemical Society, Langmuir, 7, pp. 2203-2207.
Search Report and Written Opinion of Application No. PCT/GB2005/001946, May 17, 2005.
Office Action for Chinese Patent Application No. 200580018884.2, dated Nov. 4, 2009.

(Continued)

*Primary Examiner* — John J Figueroa
(74) *Attorney, Agent, or Firm* — Robert A. Kent; McDermott Will & Emery LLP

(57) ABSTRACT

The present invention relates to aqueous tackifiers and methods of controlling particulates in subterranean formations using aqueous tackifiers. Some embodiments of the present invention provide methods of controlling particulates, comprising placing an aqueous tackifier compound into a portion of a subterranean formation comprising unconsolidated particulates; and, activating the aqueous tackifier compound. Other embodiments of the present invention provide methods of coating a portion of a surface in a subterranean formation comprising substantially coating an aqueous tackifier compound onto a portion of a subterranean formation; and, activating the aqueous tackifier compound. Other embodiments of the present invention provide treatment fluids for controlling fine particulates, comprising a servicing fluid and an aqueous tackifier compound.

32 Claims, No Drawings

OTHER PUBLICATIONS

Office Action for Ukrainian Patent Application No. 200700220, dated Nov. 18, 2009.

Foreign Search Report and Opinion (PCT Appl. No. GB2005/004044) dated Jan. 27, 2006.

* cited by examiner

AQUEOUS TACKIFIER AND METHODS OF CONTROLLING PARTICULATES

CROSS-REFERENCE TO RELATED APPLICATION

This application is related to an application filed on the same day and titled "Aqueous-Based Tackifier Fluids and Methods of Use" with named inventors Matt Blauch, Thomas Welton, and Philip Nguyen.

BACKGROUND OF THE INVENTION

The present invention relates to aqueous tackifiers, and methods of controlling particulates in subterranean formations using aqueous tackifiers.

Hydrocarbon-producing wells are often stimulated by hydraulic fracturing treatments. In hydraulic fracturing treatments, a viscous fracturing fluid, which also functions as a carrier fluid, is pumped into a producing zone at a rate and pressure such that the subterranean formation breaks down and one or more fractures are formed in the zone. Typically, particulate solids, such as graded sand, suspended in a portion of the fracturing fluid are then deposited in the fractures when the fracturing fluid is converted to a thin fluid to be returned to the surface. These particulate solids, or "proppant particulates," serve to prevent the fractures from fully closing so that conductive channels are formed through which produced hydrocarbons can flow.

One hydraulic fracturing treatment particularly useful in low closure stress conditions typically observed in shallow depth reservoirs under tectonic extension is water fracturing. In water fracturing, the fracturing fluid contains a very low or zero proppant particulates concentration. Rather than relying on proppant particulates to prop open the fractures, the process instead relies on the natural conductivity created by the formation's tendency to self-prop to prevent the fractures from closing. Coal bed methane reservoirs are an example of a reservoir well-suited for proppant particulates-free water fracturing.

Unfortunately, production enhancement and open hole completions can be negatively impacted in labile formations, such as coal beds, organic rich shales, clay or organic rich clastics, and highly fractured brittle rocks. In these formations, mechanical forces or natural in-situ stress anisotropy can result in the geologic process known as spalling, where stress-related changes in the face of formation cause fine particulates, or "fines," to "flake off" or break lose from the formation. These fines can clog the interstitial spaces of proppant packs or self-propped fractures and reduce the conductivities of the fracture, limiting the production potential of the well. Furthermore, the loose fines may also erode or cause significant wear to the production equipment used in the recovery process, and often must be separated from the produced fluids, adding further expense to the processing.

Previous attempts at controlling or mitigating the effect of loose fines have included tackification, flocculation, and agglomeration. Through these processes, the loose fines that are generated during fracturing are prevented from hindering flow as the particles migrate through the created fractures. However, most existing solutions do not address the concept of pre-stabilization of the formation before it is placed on production. Furthermore, existing solutions also typically lack the ability to remedially treat the fractures to stabilize or control the fines, and many do not offer the ability to control the activation of the treatment fluid (e.g., the treatment fluids may not be introduced into the fracture and then activated to control or mitigate the effect of the loose fines).

SUMMARY OF THE INVENTION

The present invention relates to aqueous tackifiers and methods of controlling particulates in subterranean formations using aqueous tackifiers.

Some embodiments of the present invention provide methods of controlling particulates, comprising placing an aqueous tackifier compound into a portion of a subterranean formation comprising unconsolidated particulates; and, activating the aqueous tackifier compound.

Other embodiments of the present invention provide methods of coating a portion of a surface in a subterranean formation comprising substantially coating an aqueous tackifier compound onto a portion of a subterranean formation; and, activating the aqueous tackifier compound.

Other embodiments of the present invention provide treatment fluids for controlling fine particulates, comprising a servicing fluid and an aqueous tackifier compound.

The features and advantages of the present invention will be readily apparent to those skilled in the art upon a reading of the description of the preferred embodiments that follows.

DESCRIPTION OF PREFERRED EMBODIMENTS

The present invention relates to aqueous tackifiers and methods of controlling particulates in subterranean formations using aqueous tackifiers.

In accordance with the present invention, an aqueous tackifier compound may be introduced into a portion of a subterranean fracture. As used in the present invention, the term "tacky," in all of its forms, generally refers to a substance having a nature such that it is (or may be activated to become) somewhat sticky to the touch.

Suitable aqueous tackifier compounds are capable of forming at least a partial coating upon a surface (such as a formation face or a particulate). In some embodiments, a pretreatment may be first contacted with the surface to prepare it to be coated with an aqueous tackifier compound. Generally, suitable aqueous tackifier compounds are not tacky when placed onto a surface, but are capable of being "activated" (that is destabilized, coalesced and/or reacted) to transform the compound into a sticky, tackifying compound at a desirable time. Such activation may occur before, during, or after the aqueous tackifier compound is placed in the subterranean formation.

In particular embodiments of the present invention, the aqueous tackifier compound, once activated, is also capable of forming, in effect, an adhesive network on the exposed surface of the subterranean formation that may reduce the propensity of the formation to spall or generate fine particulates upon exposure to mechanical forces or natural in-situ stress anisotropy. By coating the exposed surface of the formation with the activated aqueous tackifier compound, fewer fine particulates are able to break free, limiting the negative impact the fines may have on the well production.

Some embodiments of the present invention describe uses of aqueous tackifier compounds both to control unconsolidated particulates existing in a subterranean formation and to stabilize interface regions in a subterranean formation so as to discourage the release or generation of particulates (sometimes referred to as "fines") away from the interface. as used herein the term "unconsolidated" refers to a situation in which particulates are loosely bound together, unbound, or so weakly bound as to be able to migrate with fluids moving throughout a portion of a subterranean formation. In some embodiments of the present invention, the aqueous tackifier compound, once activated, helps to stabilize fines through an enhanced form of flocculation. As in normal flocculation, the tackified fines clump together; however, the enhanced flocculation brought about by the aqueous tackifier compounds of the present invention also allows the flocced, tacky fines to adhere to surfaces they come in contact with (e.g., the surface of the formation face or of a proppant particulate). Since the fines are tackified and remain tacky, in the event the flocced fines break loose from a surface to which they have adhered, they have the ability to re-adhere to another surface. This further reduces the probability the tackified fines will impair the production of the well.

Particular embodiments of the present invention also offer the ability to remediate subterranean fractures without the need to re-fracture or re-set proppant particulates that may have been deposited in the fracture. In embodiments of the present invention that encompass "remedial operations" (i.e. operations wherein a proppant pack is already in place and undesirable flow back has begun to occur and needs to be remediated or operations wherein a formation has begun to spall and an unstable formation surface needs to be remediated), the aqueous tackifier compounds of the present invention may be particularly well suited due, in part, to the fact that they may be placed within the region to be remediated as a non-tacky substance and then activated to take on a tacky character.

Aqueous tackifier compounds of the present invention are generally charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water (further described in Example 7). The aqueous tackifier compound enhances the grain-to-grain contact between the individual particulates within the formation (be they proppant particulates, formation fines, or other particulates), helping bring about the consolidation of the particulates into a cohesive, flexible, and permeable mass.

Examples of aqueous tackifier compounds suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof.

While many potential methods exist for determining a suitable aqueous tackifier, one practical methods of choosing a suitable polymer is as follows: place the polymer being tested in concentrated form (that is, about 20-50% concentration) and add an activator to it. If the mixture, empirically, appears to coagulate to form a solid or semisolid mass than the polymer represents a suitable aqueous tackifier according to the present invention. If the mixture does not appear to coagulate to form a solid or semisolid mass, then another activator should be chosen and the test repeated. One skilled in the art, knowing the desired result of coagulation, will be able to select likely activators. For example, when testing an acrylate-based polymer for suitability as an aqueous tackifier, an mixture comprising 50% Acetic Anhydride and 50% Glacial Acetic acid (v/v) is a likely activator. The choice of aqueous tackifier compounds may depend, inter alia, on the down hole conditions (e.g., salinity, temperature, and/or pH). The relationship between these and other down hole conditions will not be uniform across all suitable aqueous tackifier compounds. For instance, high salinity might accelerate activation for some aqueous tackifier compounds while delaying activation for others. One skilled in the art will be able to determine the effect of the particular down hole conditions on the chosen aqueous tackifier compound. For example, with polyacrylate polymers high salinity, extremes of pH (either above about 9 or below about 5) generally accelerate activation.

Suitable aqueous tackifier compounds are generally charged polymers that preferentially attach to particles having an opposite charge. For instance, an aqueous tackifier compound having a negative charge will preferentially attach to surfaces having a positive to neutral zeta potential and/or a hydrophobic surface. Similarly, using analogous chemistry, positively charged aqueous tackifier compounds will preferentially attach to negative to neutral zeta potential and/or a hydrophilic surfaces. For example, one could use a pretreatment such as a cationic polymer to treat a surface with a negative zeta potential or treat a surface with a positive zeta potential by using anionic pretreatments. As will be understood by one skilled in the art, amphoteric and zwitterionic pretreatment fluids may also be used so long as the conditions they are exposed to during use are such that they display the desired charge. In particular embodiments where the surface (formation or particulate) being treated lacks an adequately receptive surface (that is, the surface being treated lacks a charge substantially opposite of the chosen aqueous tackifier compound), a pretreatment fluid may be used to make the surfaces more receptive to the aqueous tackifier compound. Suitable pretreatment fluids include charged fluids comprising a charged surfactant, a charged polymer, or a combination thereof. As will be understood by one of skill in the art with the benefit of this disclosure, the use of a pretreatment is optional and depends, at least in part, on the charge disparity or lack thereof between the chosen aqueous tackifier compound and the surface being treated.

Portions of nearly any subterranean formation may be treated with the aqueous tackifier compounds of the present invention. Examples of formations that may be treated include, but are not limited to, coal formations, and formations containing iron-bearing minerals, such as siderite, magnetite, and hematite. Clay minerals exhibiting a natural hydrophobic character have also been shown to be treatable.

Generally, an aqueous tackifier compound of the present invention is placed in a portion of a subterranean formation by mixing the aqueous tackifier compound with a servicing fluid. Suitable servicing fluids of the present invention may be aqueous fluids, emulsions, foams, or any other known form of subterranean fluids known in the art. In some embodiments the servicing fluids of the present invention comprise fresh water. In some embodiments, salt water solutions may also be used as a servicing fluid provided the salt concentration of the fluid does not act undesirably to activate and/or destabilize the aqueous tackifier compound. Aqueous gels, foams, straight nitrogen, carbon dioxide, emulsions, and other suitable fracturing fluids (crosslinked or uncrosslinked) may also be used in accordance with the present invention. The aqueous gels are generally comprised of water and one or more gelling agents. The emulsions may be comprised of two immiscible liquids such as an aqueous gelled liquid and a liquefied, normally gaseous fluid, such as nitrogen or carbon dioxide. In exemplary embodiments of the present invention, the carrier fluids are aqueous gels comprised of water, a gelling agent for gelling the water and increasing its viscosity, and, optionally, a cross-linking agent for cross-linking the gel and further increasing the viscosity of the fluid. The increased viscosity of the gelled, or gelled and cross-linked, carrier fluid, inter alia, reduces fluid loss and allows the carrier fluid to transport significant quantities of suspended proppant particles. The water used to form the carrier fluid may be fresh water, salt water, brine, or any other aqueous liquid that does not adversely react with the other components. By using an aqueous carrier fluid, the environmental impact of subterranean treatments in accordance with the present invention may be minimized or reduced, particularly where the servicing fluid is discharged into the surface terrestrial, aquatic, or marine environments or the fluid is regulated under the U.S. EPA Safe Drinking Water Act (Section 1425, 42 U.S.C. 3000h-4(a), Section 1422(b), 42 U.S.C. 300h-1(b)).

As mentioned above, the aqueous tackifier compound is typically non-tacky when mixed with the carrier fluid. An "activator," which may comprise a number of various compounds, is used to activate (i.e., tackify) the aqueous tackifier compound. Typically, the activator is an organic acid (or an anhydride of an organic acid that is capable of hydrolyzing in water to create an organic acid), an inorganic acid, an inorganic salt (such as a brine), a charged surfactant, a charged polymer, or a combination thereof, but any substance that is capable of making the aqueous tackifier compound insoluble in an aqueous solution may be used as an activator in accordance with the teachings of the present invention. The choice of an activator may vary, depending on, inter alia, the composition of the aqueous tackifier compound. An example of one activator suitable for use in the present invention is an acetic acid/acetic anhydride blend. Other acids, acids salts, anhydrides, and mixtures thereof may be also suitable. Again, this is analogous to coagulation. For example, many nature rubber latexes are coagulated with acetic or formic acid during the manufacturing process. Suitable salts include (but not limited to): sodium chloride, potassium chloride, calcium chloride and mixtures thereof. In another exemplary embodiment of the present invention, the concentration of salts present in the formation water itself may be sufficient to activate the aqueous tackifier compound. In such an embodiment it may not be necessary to add an additional activator. Generally, when used, the activator is present in an amount in the range of from about 0.1% to about 20% by weight of the fluid volume; however, in some cases such as with brines the activator may be in excess of the treatment fluids and aqueous tackifier compound. However, any compound that will cause the activation of the aqueous tackifier compound (e.g., causing the aqueous tackifier compound to become insoluble) may be used within the teachings of the present invention, regardless of the concentration of activator necessary to trigger the activation of the aqueous tackifier compound.

The family of suitable activators is substantially the same as the family of suitable pretreatment fluids; the distinction lies, at least in part, on the amount used and the timing of its use. For example, where the same chemical or chemicals are used as a pretreatment fluid and as an activator, the pretreatment fluid may make up only from about 0.1% to about 5% of the volume of the total amount used. One skilled in the art will recognize that the pretreatment fluid is primarily used to prepare a surface to accept an aqueous tackifier compound and, generally, will not be used in an amount sufficient to substantially activate the aqueous tackifier compound. Moreover, in certain embodiments, an activator may not be necessary at all. For example, the portion of a subterranean formation being treated may contain a sufficient level of salts in the formation fluids that simply placing an aqueous tackifier compound into the formation and allowing it to contact the existing fluids will result in desired activation.

Generally, the tackification treatment of the present invention may be performed at any time during the production lifecycle of the well, often without the need to re-fracture, in a well that may or may not include a proppant pack. For example, in particular embodiments, the aqueous tackifier compound of the present invention may be used to pretreat a fracture by placing the aqueous tackifier compound in the fracture ahead of any particulates-laden fluid. In another embodiment of the present invention, the aqueous tackifier compound may be used to treat a fracture by simply using the treatment fluid (comprising a servicing fluid and an aqueous tackifier compound) as a fracturing fluid. And, in yet another embodiment of the present invention, the aqueous tackifier compound may be placed in the fracture immediately following a fracturing treatment, particulates-laden or otherwise. In this way, treatment costs may be greatly reduced and well production declines may be modified to lengthen the well's productive lifespan.

Furthermore, the aqueous tackifier compound may be exposed to the activator at any of a number of different times in the hydraulic fracturing treatment. In a particular embodiment of the present invention, the activator may be mixed with the carrier fluid at the approximately same time as the aqueous tackifier compound. In this manner, the aqueous tackifier compound, as introduced in the subterranean formation, is already activated or at least in the process of being activated. In another embodiment of the present invention, the activator may be introduced into the subterranean formation at some time after the aqueous tackifier compound has been introduced into the formation (e.g., the aqueous tackifier compound may be present in the subterranean formation for some time before it is activated). In this manner, the aqueous tackifier compound provides the ability to remedially tackify a fracture in the event spalling occurs or proppant particulates or fines need to be reconsolidated. One skilled in the art will recognize that the decision on whether to premix an activator and an aqueous tackifier compound depends, at least in part, on the activator chosen. For example, a salt activator may tend to activate the aqueous tackifier compound more rapidly than a charged surfactant activator.

To facilitate a better understanding of the present invention, the following examples of preferred embodiments are given. In no way should the following examples be read to limit or define the scope of the invention.

EXAMPLES

Example 1

A base gel comprising a borate crosslinked fracturing fluid containing 35 lb per 1000 gallon of dry guar polymer was prepared by mixing 1 liter of water containing 20 grams of KCl salt, 4.2 grams of dry guar polymer, and 0.2 ml of an acetic acid/ammonium acetate mixture (used as a pH buffer to lower the mixture's pH to about 6.5) and allowing the guar to hydrate while mixing in the blender for approximately 10 minutes. Following the hydration step, 2.5 ml of a potassium carbonate was added (used as a pH buffer) to raise pH to final base gel to about 10.2.

Brady sand (20/40 mesh) was treated with 1 ml of quaternary ammonium surfactant (per 250 g sand) and then dry coated with a 3 weight percent coating of a 40% solution of polyacrylate ester polymer.

250 grams of the coated 20/40 Brady sand was then placed in a clean 1-liter beaker 300 ml of the base gel solution is added, and the beaker was placed into a 140 F water bath with an overhead mixer. While mixing, 0.32 ml of a borate crosslinker was added to the base gel/proppant particulates slurry for about 2 minutes to allow the crosslink to initiate.

A stable crosslink was achieved and compared to a control test run using proppant particulates without the inventive treatment. Both fluids remained stable indicating the inventive solution did not have significant negative effects on the fluid stability; that is, it exhibited no detrimental effects such as failure to crosslink or premature breaking.

Upon breaking the crosslink gel with HCl, the coated sand was separated and tested and proved to exhibit a desired tacky character and improved T-test performance (see example 7). Moreover, the coated sand was found not to require additional activator to achieve desired coating properties due, at least in part, to the fact that the fracturing gel system contained activators such as KCl and was also exhibited a favorable activation pH for the acrylic-based polymer.

Example 2

Brazos River sand with particle size smaller than 100-mesh was used to simulate formation sand. This material was packed inside a 1-inch ID tapered Teflon sleeve having a length of 5 inches. About 0.5 inch thick of 20/40 mesh Ottawa sand was packed below and above the Brazos River sand material. The sand column was then saturated with 3% KCl brine and flushed with this brine at 5 mL/min for several pore volumes to determine the initial permeability of the sand pack. The Brazos River sand was then treated with 2 pore volumes of the treatment fluid (4% by volume of a 40% solution of polyacrylate ester polymer, 0.5% activator, 0.1% cationic surfactant, 0.1% amphoteric surfactant, balance water). KCl brine (3%) was then used to overflush the sand pack with 5 pore volumes. The treated sand column was then placed in the oven for curing at 175° F. for 20 hours.

After the curing period, flow from an opposite direction using 3% KCl brine was established through the treated sand column. Flow rate was held constant at 5 mL/min to determine the retained permeability of the sand pack as compared to that of the initial permeability. More than 95% of the permeability of the treated sand pack was retained and there was no sign of produced fines in the effluent collected during the 5 mL/min flow of KCl used to establish regained permeability.

The results from this example confirm that the treatment fluid was able to stabilize the formation sand material without causing excessive damage to the permeability of the sand pack.

Example 3

Similar preparation and test procedure as described in Example 2 were repeated in this example, except that different concentrations of the treatment fluid were used. Brazos River sand was used to simulate formation fines. This material was packed inside a 1-inch ID tapered Teflon sleeve having a length of 5 inches. About 0.5 inch thick of Ottawa sand with mesh size of 20/40 mesh was packed below and above the Brazos River sand material. The sand column was then saturated with 3% KCl brine and flushed with this brine at 5 mL/min for several pore volumes to determine the initial permeability of the sand pack. Then, two pore volumes of the treatment fluid (2% by volume of a 40% solution of polyacrylate ester polymer, 0.5% activator, 0.1% cationic surfactant, 0.1% amphoteric surfactant, balance water) was added. KCl brine (3%) was then used to overflush the sand pack with 5 pore volumes.

The treated sand column was then placed in the oven for curing at 175° F. for 20 hours. After the curing period, flow from an opposite direction using 3% KCl brine was established through the treated sand column. Flow rate was held constant at 5 mL/min to determine the retained permeability of the sand pack as compared to that of the initial permeability.

More than 97% of the permeability of the treated sand pack was retained. Again, there was no sign of fines produced in the effluents that were collected during the flow of regained permeability.

Example 4

Brazos river sand was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of treatment fluid (5% by volume of a 40% solution of polyacrylate ester polymer, 0.5% activator, 0.2% surfactants, balance water), and overflushed with 3 pore volumes of 3% KCl brine.

One cells was then placed in oven at 175° F. for 20 and one was placed in oven at 325° F. for 20 hours to simulate down hole curing of the well. After curing period, the treated sand was removed from the cell and observed for texture, shape, and flexibility. The treated Brazos River sand appeared as a firm structure which took the shape of the cell. Despite of having negligible consolidation strength as commonly observed with consolidated rock, the treated Brazos River sand grains stick together to form a stable structure.

Example 5

Brazos river sand was used as simulated formation sand. The material was packed into two 1.5-inch ID brass cells and sandwiched between sand packs of 70/170-mesh sand. The sand column was flushed with 3 pore volumes of 3% KCl brine, followed by 2 pore volumes of treatment fluid (5% by volume of a 40% solution of polyacrylate ester polymer, 0.5% activator, 0.2% surfactants, balance water) and no overflush was applied.

One treated column was then placed in oven at 175° F. for 20 hours and one was placed in oven at 325° F. for 20 hours to simulate down hole curing of the well. After curing period, the treated sand was removed from the cell and observed for texture, shape, and flexibility. Again, the treated Brazos River sand appeared as a firm structure which took the shape of the cell. Despite of having negligible consolidation strength as commonly observed with consolidated rock, the treated Brazos River sand grains stick together to form a stable structure.

Example 6

Fines of Brazos River sand with sieve size of 200-mesh and smaller were used to simulate formation fines. The material was packed inside a 1-inch ID transparent acrylic flow cell for ease of observation. Ottawa sand with mesh size of 20/40 mesh was pack below and above this formation fines material. The sand column was then saturated with 3% KCl brine and flushed with this brine for 5 volumes, followed by 2 pore volumes of treatment fluid (2% by volume of a 40% solution of polyacrylate ester polymer, 0.5% activator, 0.2% surfactants, balance water), and then overflushed with 2 pore volumes of 3% KCl brine.

The treated sand column was then placed in the oven for curing at 140° F. for 20 hours. After the curing period, flow using 3% KCl brine was established through the treated sand column with an opposite direction from that during treatment. Flow rate was started at 10 mL/min and incrementally increased to 80 mL/min. Effluents were collected to help confirm what had been observed in the cell during the flow. The results all indicated that the treated column was able to completely control fines migration through out all the flow rates as compared to the control.

For comparison, identical sand column prepared, but without tacification fluid treatment, was used as the control. It was observed that as soon as flow was established, fines particulate immediately began to migrate into the sand pack and produced out as part of the effluent, even at 10 mL/min.

Example 7

A sample of 20/40 Brady Sand was treated (41.25% polyacrylate ester polymer concentrate, 3.75% surfactants, 30% water followed by 25% activator) at about 2% (v/w) based on total treatment fluid volume. This sample was then placed in a T-test as follows: The evaluation of a liquid or solution of a compound for use as a tackifying compound may be accomplished by the following test: First, a critical resuspension velocity is determined for the material upon which the tackifying compound is to be coated. One suitable test apparatus comprises a ½" glass tee that is connected to an inlet source of water and an outlet disposal line is blocked to fluid flow. A water-based slurry of particulates is aspirated into the tee through inlet and collected within portion by filtration against a screen. When portion of tee is full, the vacuum source is removed and a plug is used to seal the end of portion. The flow channel from inlet to outlet then is swabbed clean and a volumetrically controlled pump is connected to inlet and a controlled flow of water is initiated. The velocity of the fluid is slowly increased through inlet until the first particle of particulate material is picked up by the flowing water stream. This determines the baseline for the starting of the resuspension velocity. Next, the flow rate then is further increased until the removal of particles becomes continuous. This determines the baseline for the continuous resuspension velocity. Next, the test may then be terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test may be repeated to determine the starting point of particulate removal and the velocity at which removal becomes continuous. The percent of velocity increase (or decrease) then is determined based upon the initial or continuous baseline value.

Effectively treated proppant particulates will resist transport as compared to untreated proppant particulates. The test sample did not show signs of movement even when the test apparatus flowed at its maximum rate of 2,000 mL/min. Untreated 20/40 Brady Sand started flowing at 154 mL/min; the treated sand resisted flowing at fluid rates over 13-times faster than untreated.

Example 8

A sample of 20/40 Brady Sand was treated (40% polyacrylate ester polymer concentrate, 5% surfactants, 10% activator, balance water) at about 2% (v/w) based on total treatment fluid volume. This sample showed a 13% improvement of proppant pack conductivity versus untreated 20/40 Brady Sand. The treated proppant pack was also observed to exhibit desired adhesive character with individual particulate grains adhesively and elastically bound together.

Example 9

One method of determining whether a polymer is suitable for use as an aqueous tackifier: Prepare mixture consisting of 50% Acetic Anhydride and 50% Glacial Acetic acid (v/v). Place 10 ml of test polymer into 60 ml glass bottle. Next, add 40 ml of deionized water and hand swirl to mix. Then, add 15 ml of acetic acid/acetic anhydride (or other activator). Shake bottle vigorously for 30 s. A suitable polymer will form a solid or semi-solid mass. Repeat screen with other known activators such as acetic acid/acetic anhydride blend, other acids, acids salts, anhydrides, charged polymers, charged surfactants, sodium chloride, potassium chloride, calcium chloride and mixtures thereof.

Example 10

Treatments were performed on a coal bed methane field exhibiting relatively low individual well production. Well production was suspected to be at least partially impaired by coal fines blocking inflow of gas to the well bore. The wells had been previously hydraulically fractured in multiple coal seams. Two wells were treated with solution comprising acetic anhydride, glacial acetic acid, a polyacrylate ester polymer aqueous tackifier compound, enzyme, and oxidizer in water.

The first well went from a methane production of about 43 MCFD (thousand cubic feet per day) before treatment to about 75 MCFD after treatment. Similarly, the second well went from a methane production of about 80 MCFD before treatment to about 105 MCFD after treatment. Moreover, observations from these treated wells show the produced water to be free of fine particulates as compared to their pre-treatment state; thus supporting the hypothesis that effective stabilization of the formation particles was achieved.

Example 11

A 50 ml slurry of ground coal particles (Subitmunious A) was prepared from dry coal ground with a mortar and pestle and placed into a bottle containing fresh water and slurried. The coal/water slurry was then treated with 10 ml of a solution comprising acetic anhydride, glacial acetic acid, water, and a polyacrylate ester polymer aqueous tackifier compound. Following treatment initial flocculation of the coal particles was observed over about a period of 12 hours, after which the coal particles were observed as an agglomerated mass that was capable of breaking and re-forming upon agitation. The water phase is clarified with no visible fine particles remaining in solution. This example illustrated visually the described process of coal fines stabilization and removal from aqueous solution.

Example 12

A solid sample of coal approximately 2 cm square was placed in a 60 ml bottle containing water. The bottle was then placed in an ultra-sonicator for 10 minutes. The result was a visible amount of coal particles that spalled from the surface of the larger chunk. In another bottle, a substantially identical sample of coal was treated with a solution comprising acetic anhydride, glacial acetic acid, water, and a polyacrylate ester polymer aqueous tackifier compound and then placed in water and then placed in an ultra-sonicator for 10 minutes. Visual observation of the treated coal sample showed a nearly complete lack of coal fines spalling from the surface of the coal that has been treated.

Example 13

A treatment was performed on a weakly consolidated gas producing clastic formation exhibiting low well production. Well production was suspected to be at least partially impaired by fines blocking inflow of gas to the well bore. The wells had been previously hydraulically fractured. The well was treated with an aqueous tackifier compound comprising a polyacrylate ester, acetic anhydride/acetic acid, quaternary ammonium surfactant, amphoteric surfactant, enzyme, and oxidizer in water. The well's production went from 30 MCFD to 200 MCFD, showing that the fines problem had been substantially remediated.

Example 14

A 100 gram sample of 20/40 Brady Sand was treated (2% cationic polyacrylamide polymer concentrate, 94% water followed by 4% acetic anhydride/acetic acid activator with 100 ml of cationic tackifing fluid. Upon recovery the Brady Sand exhibited the desired tacky characteristics.

Example 15

A 1 gram sample of activated coal fines was treated (2% cationic polyacrylamide polymer concentrate, 1% anionic surfactant, 93% water followed by 4% acetic anhydride/acetic acid activator) with 100 ml of cationic tackifing fluid. The fines were consolidated into a tacky mass within 5 minutes.

Example 16

A 1 gram sample of activated coal fines was treated (2% cationic polyacrylamide polymer concentrate, 1% anionic surfactant, 1% amphoteric surfactant, 92% water followed by 4% acetic anhydride/acetic acid activator) with 100 ml of cationic tackifing fluid. The fines were consolidated into a tacky mass within 5 minutes.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method comprising:
providing a servicing fluid comprising an aqueous tackifier compound, wherein the aqueous tackifier compound comprises at least one compound selected from the group consisting of: an acrylic acid ester polymer, an acrylic acid homopolymer, an acrylic acid ester homopolymer, an acrylamido-methyl-propane sulfonate homopolymer, an acrylamido-methyl-propane sulfonate derivative homopolymer, and any mixture thereof;
activating the aqueous tackifier compound with a chemical activator to form an activated aqueous tackifier compound, wherein the chemical activator comprises at least one compound selected from the group consisting of: an organic acid, an anhydride of an organic acid, an inorganic acid, a charged surfactant, a charged polymer, and any combination thereof,
wherein activating involves transforming the aqueous tackifier compound from a not tacky form to a tacky form that is the activated aqueous tackifier compound; and
placing the servicing fluid into a subterranean formation via a well bore; and allowing the activated aqueous tackifier compound in the servicing fluid to enhance the grain-to-grain contact between subterranean formation particulates.

2. The method of claim 1, wherein the servicing fluid comprises at least one fluid selected from the group consisting of: an aqueous fluid, an emulsion, and a foam.

3. The method of claim 1, wherein the servicing fluid is crosslinked.

4. The method of claim 1, wherein the aqueous tackifier compound is activated before placing the servicing fluid into the subterranean formation.

5. The method of claim 1, wherein the aqueous tackifier compound is activated while placing the servicing fluid into the subterranean formation.

6. The method of claim 1, wherein the aqueous tackifier compound is activated subsequent to placing the servicing fluid into the subterranean formation.

7. The method of claim 1, wherein the activated aqueous tackifier compound preferentially binds to surfaces having a positive zeta potential.

8. The method of claim 1, wherein the activated aqueous tackifier compound preferentially binds to hydrophobic surfaces.

9. The method of claim 1, wherein the activated aqueous tackifier compound preferentially binds to surfaces having a negative zeta potential.

10. The method of claim 1, wherein the activated aqueous tackifier compound preferentially binds to hydrophilic surfaces.

11. The method of claim 1, wherein activating the aqueous tackifier compound with a chemical activator comprises destabilizing the aqueous tackifier compound.

12. The method of claim 1, wherein the chemical activator further comprises an acetic acid/acetic anhydride blend.

13. The method of claim 1, further comprising, before placing the servicing fluid into a portion of a subterranean fracture, introducing a pretreatment fluid into the portion of the subterranean formation.

14. The method of claim 13, wherein the pretreatment fluid is introduced into the subterranean fracture prior to introducing the servicing fluid into the subterranean fracture.

15. The method of claim 13 wherein the pretreatment fluid comprises at least one compound selected from the group consisting of: a charged surfactant, a charged polymer, and any combination thereof.

16. The method of claim 1, wherein the chemical activator is present in the subterranean formation prior to placing the aqueous tackifier compound therein.

17. A method comprising:
providing a servicing fluid comprising an aqueous tackifier compound wherein the aqueous tackifier compound comprises at least one compound selected from the group consisting of: an acrylic acid polymer, an acrylic acid ester polymer, an acrylic acid homopolymer, an acrylic acid ester homopolymer, an acrylamido-methylpropane sulfonate homopolymer, an acrylamido-methyl-propane sulfonate derivative homopolymer, and any mixture thereof;

activating the aqueous tackifier compound with a chemical activator to form an activated aqueous tackifier compound and placing the servicing fluid into a subterranean formation via a well bore,
wherein activating involves transforming the aqueous tackifier compound from a not tacky form to a tacky form that is the activated aqueous tackifier compound; and allowing the activated aqueous tackifier compound in the servicing fluid to at least partially coat and form an adhesive surface on an exposed surface of the subterranean formation.

18. A method comprising:
providing a servicing fluid comprising an aqueous tackifier compound;
activating the aqueous tackifier compound with a chemical activator comprising an acetic acid/acetic anhydride blend to form an activated aqueous tackifier compound, and placing the activated aqueous tackifier compound servicing fluid into a subterranean formation via a well bore after; and
allowing the activated aqueous tackifier compound in the servicing fluid to consolidate particulates within the formation.

19. The method of claim 18, wherein the servicing fluid comprises at least one fluid selected from the group consisting of: an aqueous fluid, an emulsion, and a foam.

20. The method of claim 18, wherein the servicing fluid is crosslinked.

21. The method of claim 18, wherein the aqueous tackifier compound is activated before placing the servicing fluid into the subterranean formation.

22. The method of claim 18, wherein the aqueous tackifier compound is activated while placing the servicing fluid into the subterranean formation.

23. The method of claim 18, wherein the aqueous tackifier compound is activated subsequent to placing the servicing fluid into the subterranean formation.

24. The method of claim 18, wherein the activated aqueous tackifier compound preferentially binds to surfaces having a positive zeta potential.

25. The method of claim 18, wherein the activated aqueous tackifier compound preferentially binds to hydrophobic surfaces.

26. The method of claim 18, wherein the activated aqueous tackifier compound preferentially binds to surfaces having a negative zeta potential.

27. The method of claim 18, wherein the activated aqueous tackifier compound preferentially binds to hydrophilic surfaces.

28. The method of claim 18, wherein activating the aqueous tackifier compound with a chemical activator comprises destabilizing the aqueous tackifier compound.

29. The method of claim 18, wherein the chemical activator further comprises at least one compound selected from the group consisting of: an organic acid, an anhydride of an organic acid, an inorganic acid, an inorganic salt, a charged surfactant, a charged polymer, and any combination thereof.

30. The method of claim 18, further comprising, before placing the servicing fluid into a portion of a subterranean fracture, introducing a pretreatment fluid into the portion of the subterranean formation.

31. The method of claim 30, wherein the pretreatment fluid is introduced into the subterranean fracture prior to introducing the servicing fluid into the subterranean fracture.

32. The method of claim 30 wherein the pretreatment fluid comprises at least one compound selected from the group consisting of: a charged surfactant, a charged polymer, and any combination thereof.

* * * * *